United States Patent [19]

Wheland

[11] Patent Number: 5,142,000

[45] Date of Patent: Aug. 25, 1992

[54] PROCESS FOR INCREASING POLYAMIDE MOLECULAR WEIGHT WITH ORGANOPHOSPHONIC ACID OR ESTER CATALYSTS IN THE PRESENCE OF ALUMINA-CONTAINING TITANIUM DIOXIDE

[75] Inventor: Robert C. Wheland, Wilmington, Del.

[73] Assignee: E. I. Du Pont de Nemours and Company, Wilmington, Del.

[21] Appl. No.: 751,024

[22] Filed: Aug. 28, 1991

[51] Int. Cl.⁵ ............................................. C08G 69/48
[52] U.S. Cl. ..................................... 525/420; 524/99;
524/124; 524/606; 524/419
[58] Field of Search ................ 525/420, 419; 524/606, 524/99, 124

[56] References Cited

U.S. PATENT DOCUMENTS 4,912,175  3/1990  Wheland et al. ..................... 525/420
4,966,949 10/1990  Wheland ............................... 525/420

Primary Examiner—Harold D. Anderson
Attorney, Agent, or Firm—William H. Hamby

[57] ABSTRACT

A process for increasing the molecular weight of a polyamide in the presence of alumina-containing titanium dioxide, said process comprising heating a polyamide containing terminal carboxy and amino groups, and alumina-containing titanium dioxide, in the presence of a catalytically effective quantity of at least one phosphonic acid catalyst and/or ester thereof selected from:

$$R(CH_2)_nPO_3R^1_2 \quad (I)$$

wherein:
R is 2-pyridyl or 2-methoxyphenyl;
each $R^1$ is independently selected from H or $C_{1-10}$ alkyl; and
n is 0 or an integer of from 2-5 with the proviso that n is 0 when R is 2-methoxyphenyl.

14 Claims, No Drawings

PROCESS FOR INCREASING POLYAMIDE MOLECULAR WEIGHT WITH ORGANOPHOSPHONIC ACID OR ESTER CATALYSTS IN THE PRESENCE OF ALUMINA-CONTAINING TITANIUM DIOXIDE

FIELD OF THE INVENTION

This invention relates to polyamides, especially nylon, and more particularly to a method of increasing the molecular weight of polyamides in the presence of alumina-containing titanium dioxide.

BACKGROUND OF THE INVENTION

It is conventional in the production of polyamides, especially nylon, to subject the polyamide to treatment with a catalyst in order to increase the molecular weight of the polyamide, the process being termed "amidation". The general reaction involved in nylon amidation is the formation of an amide bond by the reaction of terminal carboxylic and amino groups of the polymer, with the process being generally conducted at an elevated temperature, particularly near the melting point of the polymer, in the presence of the catalyst. Such a process is described in U.S. Pat. No. 3,763,113 wherein the catalyst is a phosphonic acid of the formula:

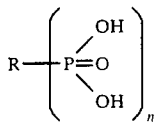

wherein n is 1, 2 or 3, and $R^1$ is a mono-, di- or trivalent organic radical depending on the value of n.

The patent states that the organic radicals represented by R, which are attached to the phosphorus atom through a carbon atom of said radical, are preferably mono-, di- or tri-valent aliphatic, cycloaliphatic, aryl, aralkyl or aralkenyl radicals, or such radicals in which a carbon atom is replaced by a hetero atom, in particular the nitrogen atom. It is most preferred that the organic radical be a lower alkyl, a cyclohexyl, a monocyclic aryl lower alkyl or a monocyclic aryl radical. Of all the examples in the patent, the only example of an organic radical wherein R contains a hetero atom is Example 8, employing 1-piperidinophosphonic acid.

In another patent by the same inventors, Burrows et al., U.S. Pat. No. 3,944,518, the combination of a phosphonic acid salt with an organic diamine is employed in order to increase the polymerization rate as well as to provide a polymer of improved whiteness. Mostly all of the examples utilize cyclohexylphosphonic acid, but in Example 12, part (d), there is an incidental experiment of β-(ethylamino)-ethylphosphonic acid being employed in conjunction with hexamethylene diamine.

In French Patent No. 1,531,145, corresponding to British 1,193,435, the use of alkali and alkaline earth metal salts of a phosphonic acid is disclosed to produce high molecular weight nylon-6,6 and 6,8. Among the acids used to make the salts is p-methoxyphenylphosphonic acid.

In U.S. Pat. No. 3,509,107 phenylphosphonic acid is disclosed to increase the relative viscosity of nylon-6,6.

In U.S. Pat. No. 3,365,428, including the prior art cited therein, analogous phosphonic acids and salts thereof are disclosed, the patent specifically disclosing the use of such compounds as catalysts for the polymerization of polyamides. (Though not directly relevant, in U.S. Pat. No. 3,825,508, various reducing hydrocarbon-substituted phosphonic and phosphoric acids are proposed for use in the polymerization of a polyamide of a diamine and methyl tere- or isophthalic acid, for different purposes.)

In U.S. Pat. No. 4,912,175 (incorporated by reference herein) a process is disclosed for increasing polyamide molecular weight by heating a polyamide containing terminal carboxy and amino groups in the presence of a catalytically effective quantity of at least one phosphonic and/or phosphinic acid catalyst and/or esters thereof selected from:

(A) $R^1(CH_2)_nPO_3R^2{}_2$ and $R^1(CH_2)_nPO_2HR^2$ where $R^1$ is 2-pyridyl, $NHR^4$ or $NH_2$, n is an integer of from 2-5, $R^2$, same or different, is H or $C_xH_{2x+1}$, $R^4$, same or different, is $C_xH_{2x+1}$, and x is an integer of 1-10; and (B) $R^3X(CH_2)_{n'}PO_3R^2{}_2$ and $R^3X(CH_2)_{n'}PO_2HR^2$ where U X is S or O, n' is an integer of 2-5, $R^3$ is H or $C_xH_{2x+1}$, x is 0 or an integer of 1-10 and $R^2$ is defined as for formula (A). These catalysts are shown to provide a substantial increase in the rate and extent of polyamidation as compared to phenylphosphinic acid.

In the present invention it has been discovered that some of the catalysts disclosed in U.S. Pat. No. 4,912,175 are surprisingly effective at increasing the molecular weight of polyamides in the presence of titanium dioxide particles containing alumina, a material which is highly detrimental to the catalytic activity of conventional phosphorus containing amidation catalysts.

SUMMARY OF THE INVENTION

An object of this invention is to provide an improved catalytic amidation process for increasing the molecular weight of polyamides, especially nylon, said polyamides being in the presence of particulate titanium dioxide containing alumina. Further aspects and advantages of this invention will become apparent upon further study of the specification and appended claims.

The process of the invention comprises heating a polyamide containing terminal carboxy and amino groups, and alumina-containing titanium dioxide, in the presence of a catalytically effective quantity of at least one phosphonic acid catalyst and/or ester thereof selected from:

$$R(CH_2)_nPO_3R^1{}_2 \quad (1)$$

wherein:
R is 2-pyridyl or 2-methoxyphenyl;
each $R^1$ is independently selected from H or $C_{1-10}$ alkyl; and
n is 0 or an integer of from 2-5 with the proviso that n is 0 when R is 2-methoxyphenyl.

These catalysts are shown to provide a substantial increase in the rate and extent of amidation in the presence of alumina-containing titanium dioxide as compared to conventional phosphorus-containing amidation catalysts such as phenylphosphinic acid.

DETAILED DESCRIPTION OF THE INVENTION

Preferred embodiments of the catalysts of formula I include those wherein R is 2-pyridyl, n is 2 or 3, and each $R^1$ is H or linear alkyl of 1 to 4 carbon atoms.

More preferably each $R^1$ is $C_{2-4}$ alkyl. Most preferred catalysts are those of formula I wherein each $R^1$ is ethyl or n-butyl and n is 2. Also preferred are the catalysts of formula I wherein R is 2-methoxyphenyl and each $R^1$ is H or linear alkyl of 1-4 carbon atoms; more preferably each $R^1$ is $C_{2-4}$ alkyl, most preferably ethyl.

Although all catalysts of formula I perform satisfactorily in the presence of alumina-containing $TiO_2$, it is found, surprisingly, that the alkyl esters ($R^1$ is alkyl) are more effective than the free acids ($R^1$ is H). This is the reverse of what is observed with conventional phosphorus containing polyamidation catalysts of the art wherein the free acids are more effective.

With respect to those catalysts of the invention wherein R is 2-pyridyl, it is contemplated that this radical can be substituted by any moiety which does not deleteriously interfere with the catalytic activity or stability of the present catalysts. Non-limiting examples of such substituted 2-pyridyl radicals include those substituted in the 3, 4 and/or 5 positions with at least one alkyl radical containing from 1 to about 6 carbon atoms. The same non-deleterious substitution is also contemplated with respect to the alkylene group bridging the phosphonic acid and 2-pyridyl groups.

With respect to those catalysts of the invention wherein R is 2-methoxyphenyl, it is also contemplated that this radical can be substituted by any moiety which does not deleteriously interfere with the catalytic activity or stability of the present catalysts. Nonlimiting examples of such substituted 2-methoxyphenyl radicals include those substituted in the 3, 4 and/or 5 positions with at least one alkyl radical containing from 1 to about 6 carbon atoms. It is also contemplated with respect to the present catalysts wherein R is 2-methoxyphenyl that polar substituents other than methoxy will be found which are effective in increasing the catalytic activity of conventional unsubstituted phenyl phosphonic acid amidation catalysts and/or esters thereof.

With respect to those catalysts of formula I wherein one or both $R^1$ groups are alkyl, it is also contemplated that said alkyl groups may also be nondeleteriously substituted; for example, some of the hydrogen atoms may be replaced by alkyl groups having from 1 to about 6 carbon atoms.

The catalysts used in the process of this invention are either known chemical entities or they can be produced in accordance with conventional processes. A preferred process for making the dialkyl o-methoxyphenylphosphonate catalysts comprises reacting the appropriate bromide with an alkyl phosphite in the presence of UV radiation. The compound 2-(2'-pyridyl)ethyl phosphonate was synthesized by the base catalyzed addition of diethylphosphite to 2-vinylpyridine. The synthesis of the latter compound has been disclosed in the following reference: E. Maruszewska-Wieczorkowska, J. Michalski, J. Org. Chem., 23, 1886 (1958). 3-(2'-pyridyl)propylphosphonic acid has been disclosed in the reference, E. Maruszewska-Wieczorkowska, J. Michalski, Roczniki Chemii Ann. Soc. Chim. Polonorum, 37, 1315 (1963).

The polyamides used in the process of this invention are conventional. They embrace aliphatic polyamides and likely "mixed" polyamides prepared from aliphatic diamines and aromatic diacids. Preferred polyamides are nylons, including but not limited to nylon-6 and nylon-6,6. These and other nylons known in the field are well described as to structure and manufacture, and for further reference, attention is invited to the patent and general literature, for example, the Kirk-Othmer Encyclopedia of Chemical Technology, 3rd edition, John Wiley and Sons, under the headings "Polyamides", "Polyamide Fibers" and "Polyamide Plastics", as well as the Encyclopedia of Textiles, Fibers and Non-Woven Fabrics, John Wiley and Sons, Inc., 1984, pages 347-380, relating to polyamide fibers. For the purposes of the present invention, nylon-6,6 is the most preferred species.

Commercial polyamides, especially nylons used in fiber manufacture, are often produced in the presence of titanium dioxide, $TiO_2$, which is added to improve visual properties of the product; for example as a delusterant. Titanium dioxide is added in particulate form and contains up to about 8% by weight of alumina to modify $TiO_2$ acidity and improve its dispersibility. The titanium dioxide and alumina may be admixed by any conventional mixing method, although methods which concentrate the alumina on the titanium dioxide particle surfaces are preferred. Other additives may also be present in the coating composition, but such additives are believed to be substantially inert in the polyamidation reaction. The presence of alumina, however, has a seriously deleterious effect on the catalytic activity of conventional phosphorus-containing amidation catalysts and it is a surprising and unexpected result of the present invention that the catalysts of formula I operate efficiently in the presence of alumina-containing $TiO_2$. Alumina-containing $TiO_2$, having about 2% by weight of alumina, is used in Comparative Example 5 and Examples 1-6.

Alumina-containing $TiO_2$ is present at a concentration of up to about 5% by weight based on the weight of polyamide. A lower limit of concentration of alumina-containing $TiO_2$ is difficult to characterize; it is determined by the optical properties desired in the polyamide product. As is shown in Comparative Examples 3 and 4, pure alumina is detrimental to catalyst performance. However, the catalysts of this invention operate satisfactorily in the presence of commercial alumina-containing titanium dioxide which typically contains less than about 8% by weight, preferably about 2% by weight of alumina (Examples 1-6).

It is suggested that the alumina-containing titanium dioxide may contain up to about 8 percent by weight of alumina. A lower limit of alumina present in alumina-containing $TiO_2$ is characterized as the amount of alumina required to render the $TiO_2$ dispersible. Without intending to be limited to a particular quantity, it is expected that amounts as low as $\frac{1}{4}$ percent by weight of alumina are adequate for dispersibility.

The catalysts of this invention are preferably used at above the melting temperature of the polyamide, the upper limit being generally dictated by the decomposition temperature of the polymer. In the case of nylon-6,6, the operating temperature is about 265°-300° C., preferably 270°-295° C.

Conversely, the catalysts can also be employed below the melting temperature of the polymer, preferably at least 15° C. below the melting point to avoid working with a hard to handle, sticky mass. For example, since nylon-6,6 melts at 260° C., the preferred operating temperature for employing the catalysts below the melting point is 140°-245° C.

The reaction time should be sufficient to obtain the desired increase in molecular weight. Similarly, the amount of phosphonic catalysts employed in the polyamidation reaction is sufficient to obtain a catalytic effect, the preferred concentration of phosphonic acid or esters thereof, for example, being about 0.2 to 20 moles, preferably about 0.5 to 10 moles.

The preferred specific embodiments of the present invention are to be construed as illustrative and not in any way limitative of the remainder of the disclosure.

In the foregoing and in the following examples, all temperatures are set forth uncorrected in degrees Celsius and unless otherwise indicated, all parts and percentages are by weight.

GENERAL PROCEDURE FOR MELT POLYAMIDATION

Low molecular weight polyamide samples were melted under an equilibrating steam pressure of 760 mm (101 kPa). The steam pressure was reduced to 200 mm (26.7 kPa) and the amidation reaction quenched before a new equilibrium could be attained. Relative viscosity (RV) was then measured. The magnitude of the relative viscosity after this procedure is representative of the rate at which the sample approached a new equilibrium with 200 mm of steam and is therefore representative of the effectiveness of the catalyst in the sample. Where present in the Comparative Examples and Examples of the invention, catalyst was added at 10 moles/$10^6$ g and $TiO_2$ was added at 3 weight % relative to polyamide.

COMPARATIVE EXAMPLE 1

No Catalyst, No $TiO_2$

A Pyrex ® (a trademark of Corning, Inc.) tube 200 mm long and 28 mm in inside diameter was loaded with 2 ml of water and 10 g of 66 nylon (Zytel ® 101 nylon resin, a trademark of E. I. du Pont de Nemours and Company). The top of the tube was sealed with a reactor head made by Lab-Crest Scientific that was fitted with gas ports, a syringe port, and a helical stirrer. After flushing the contents of the tube for 5 minutes with argon, the bottom 6 to 7 inches of the tube were lowered into a refluxing dimethylphthalate vapor bath at 282° C. This caused the 2 ml of water already in the tube to rapidly vaporize providing the start of a steam atmosphere. After 5 minutes additional water was pumped into the reaction tube at 1 ml/minute in order to maintain a steam atmosphere and to flush out any residual argon. After another 55 minutes, water addition was stopped. Five minutes later the helical stirrer was started and stirring continued for 30 minutes at 282° C. under 760 mm of retained steam. Polymerization was initiated by evacuating the tube to a pressure of 200 mm. Ten minutes later the vacuum was replaced by argon at 760 mm, stirring was stopped, polymer was allowed to drain briefly from the helical stirrer, and the tube transferred from the dimethylphthalate vapor bath to an ice water bath, quenching the reaction and breaking the glass tube. The recovered nylon was ground up to 5.5 g of coarse powder which was found to have a relative viscosity of 88.

COMPARATIVE EXAMPLE 2

2-(2'Pyridyl)ethylphosphonic Acid + 0.2% Alumina High Inhibitory Effect of Pure Alumina The same procedure, materials and quantities were used as in Comparative Example 1 except that the Pyrex ® tube also contained 0.02 g of a Boehmite alumina (Condea, Pural SCF grade Alumina) and 0.0187 g of 2-(2'-pyridyl)ethylphosphonic acid (PEPA). Catalyst concentration was 10 moles of PEPA per $10^6$ g of polymer and alumina concentration was 0.2% relative to polymer. After polymerization the recovered nylon was ground up to 5.64 g of coarse powder which had a relative viscosity of 87.

COMPARATIVE EXAMPLE 3

2-(2'-Pyridyl)ethylphosphonic Acid + 3% Alumina Inhibitory Effect of Pure Alumina The same procedure, materials and quantities were used as in Comparative Example 1 except that the Pyrex ® tube also contained 0.3 g of chromatographic grade alumina (ICN B, #02069) and 0.0187 g of PEPA. Catalyst concentration was 10 moles of PEPA per $10^6$ g of polymer and alumina concentration was 3% relative to polymer. After polymerization the recovered nylon was ground up to 4.64 g of coarse powder which had a relative viscosity of 107.

COMPARATIVE EXAMPLE 4

32-(2'-Pyridyl)ethylphosphonic Acid + 3% Pure $TiO_2$ Non-inhibitory Effect of Pure $TiO_2$ The same procedure, materials and quantities were used as in Comparative Example 1 except that the Pyrex ® tube also contained 0.3 g of pure, alumina-free titanium dioxide and 0.0187 g of PEPA. Catalyst concentration was 10 moles of (PEPA) per $10^6$ g of polymer and alumina -free $TiO_2$ concentration was 3% relative to polymer. After polymerization the recovered nylon was ground up to 2.85 g of coarse powder which had a relative viscosity of 253.

COMPARATIVE EXAMPLE 5

Phenylphosphinic Acid + 3% Alumina-Containing $TiO_2$ Inhibitory Effect of Alumina-Containing $TiO_2$ on Relative Viscosity The same procedure, materials and quantities were used as in Comparative Example 1 except that the Pyrex ® tube also contained 0.3 g of alumina-containing $TiO_2$ and 0.0142 g of phenylphosphinic acid (PPA). The alumina content of the $TiO_2$ was about 2 weight %. Catalyst concentration was 10 moles of PPA per $10^6$ g of polymer and alumina-containing $TiO_2$ concentration was 3% relative to polymer. After polymerization the recovered nylon was ground up to 4.94 g of coarse powder which had a relative viscosity of 113.

EXAMPLE 1

2-(2'-Pyridyl)ethylphosphonic Acid + 3% Alumina-Containing $TiO_2$ Lessened Inhibition by Alumina-Containing $TiO_2$ The same procedure, materials and quantities were used as in Comparative Example 1 except that the Pyrex ® tube also contained 0.3 g of alumina-containing titanium dioxide and 0.0188 g of PEPA. Catalyst concentration was 10 moles of PPA per $10^6$ g of polymer and aluminacontaining $TiO_2$ concentration was 3% relative to polymer. After polymerization the recovered nylon was ground up to 4.35 g of coarse powder which had a relative viscosity of 134.

EXAMPLE 2

PEPA Diethyl Ester + 3% Alumina-Containing $TiO_2$ Higher Activity of Ester with Alumina-Containing $TiO_2$ The same procedure, materials and quantities were used as in Comparative Example 1 except that the Pyrex ® tube also contained 0.3 g of alumina-containing titanium dioxide and 0.0243 g of the diethyl ester of PEPA. Catalyst concentration was 10 moles of PEPA diethyl ester per $10^6$ g of polymer and alumina-containing $TiO_2$ concentration was 3% relative to polymer. After polymerization the recovered nylon was ground up to 4.10 g of coarse powder which had a relative viscosity of 154.

EXAMPLE 3

PEPA Dibutyl Ester + 3% Alumina-Containing $TiO_2$
Higher Activity of Ester with Alumina-Containing $TiO_2$ The same procedure, materials and quantities were used as in Comparative Example 1 except that the Pyrex ® tube also contained 0.3 g of commercial alumina-containing titanium dioxide and 0.0299 g of the di(n-butyl) ester of PEPA. Catalyst concentration was 10 moles of di-(n-butyl) ester of PEPA per $10^6$ g of polymer and alumina-containing $TiO_2$ concentration was 3% relative to polymer. After polymerization the recovered nylon was ground up to 6.16 g of coarse powder which had a relative viscosity of 160.

EXAMPLE 4

2-Methoxyphenylphosphonic Acid + 3% Alumina-Containing $TiO_2$

Lessened Inhibition by Alumina-Containing $TiO_2$

The same procedure was used as in Comparative Example 5 except that the Pyrex ® tube contained 0.0188 g of 2-methoxyphenylphosphonic acid in place of phenylphosphinic acid. Catalyst concentration was 10 moles of 2-methoxyphenylphosphonic acid per $10^6$ g of polymer and alumina-containing $TiO_2$ concentration was 3% relative to polymer. After polymerization the recovered nylon was ground up to 3.02 g of coarse powder which had a relative viscosity of 121.

EXAMPLE 5

2-Methoxyphenylphosphonic Acid Diethyl Ester + 3% Alumina-Containing $TiO_2$ Higher Activity of Ester The same procedure was used as in Example 4 except that the Pyrex ® tube contained 0.0244 g of 2-methoxyphenylphosphonic acid diethyl ester in place of 2-methoxyphenylphosphonic acid. Catalyst concentration was 10 moles of 2-methoxyphenylphosphonic acid diethyl ester per $10^6$ g of polymer and alumina-containing $TiO_2$ concentration was 3% relative to polymer. After polymerization the recovered nylon was ground up to 4.89 g of coarse powder which had a relative viscosity of 144.

EXAMPLE 6

3-(2'-Pyridyl)propylphosphonic Acid + 3% Alumina-Containing $TiO_2$

The same procedure was used as in Example 4 except Pyrex ® tube contained 0.0201 g of 3-(2'-pyridyl)-propylphosphonic acid in place of 2-methoxyphenylphosphonic acid. Catalyst concentration was 10 moles of 3-(2'-pyridyl)propylphosphonic acid per $10^6$ g of polymer and alumina-containing $TiO_2$ concentration was 3% relative to polymer. After polymerization the recovered nylon was ground up to 4.59 g of coarse powder which had a relative viscosity of 169.

The results of the Comparative Examples (denoted by "C" and number) and Examples (denoted by number) of the invention are summarized in the Table.

| Example | Catalyst | Relative Viscosity |
|---------|----------|--------------------|
| C1 | None | 88 |
| C2 | PEPA + Boehmite alumina | 87 |
| C3 | PEPA + Chromatographic alumina | 107 |
| C4 | PEPA + Pure $TiO_2$ | 253 |
| C5 | PPA + ACT | 113 |
| 1 | PEPA + ACT | 134 |
| 2 | PEPA Diethyl Ester + ACT | 154 |
| 3 | PEPA Dibutyl Ester + ACT | 160 |
| 4 | MOPPA Diethyl Ester + ACT | 144 |
| 5 | MOPPA + ACT | 121 |
| 6 | PPPA + ACT | 169 |

PPA: Phenylphosphinic acid
PEPA: 2-(2'-pyridyl)ethylphosphonic acid
PPPA: 3-(2'-pyridyl)propylphosphonic acid
MOPPA: 2-Methoxyphenylphosphonic acid
ACT: Alumina-containing titanium dioxide The preceding examples can be repeated with similar success by substituting the generically or specifically described reactants and/or operating conditions of this invention for those used in the preceding examples. In general, high values for relative viscosity (a trend indicated by the examples) are desirable as they are indicative of further reaction than low values of relative viscosity (a trend indicated by the comparative examples). As one proceeds down the table from the comparative examples to the examples, the relative catalytic inhibition caused by alumina containing $TiO_2$ decreases as evidenced by the larger final RV's.

From the foregoing description, one skilled in the art can easily ascertain the essential characteristics of this invention, and without departing from the spirit and scope thereof, can make various changes and modifications of the invention to adapt it to various usages and conditions. For example, functional acid derivatives and sources of acid or ester are contemplated as equivalents of the above-described catalysts. Also, mixtures of catalysts are contemplated.

What is claimed is:

1. A process for increasing the molecular weight of a polyamide in the presence of alumina-containing titanium dioxide, said process comprising heating a polyamide containing terminal carboxy and amino groups, and alumina-containing titanium dioxide, in the presence of a catalytically effective quantity of at least one phosphonic acid catalyst, ester or mixture thereof selected from:

$$R(CH_2)_n PO_3 R^1_2 \qquad (1)$$

wherein:
R is 2-pyridyl or 2-methoxyphenyl;
each $R^1$ is independently selected from H or $C_{1-10}$ alkyl; and
n is 0 or an integer of from 2–5 with the proviso that n is 0 when R is 2-methoxyphenyl.

2. A process according to claim 1 wherein R is 2-pyridyl.

3. A process according to claim 2 wherein n is 2 or 3.

4. A process according to claim 3 wherein each $R^1$ is H or linear $C_{2-4}$ alkyl.

5. A process according to claim 4 wherein each $R^1$ is linear $C_{2-4}$ alkyl.

6. A process according to claim 5 wherein each $R^1$ is ethyl and n is 2.

7. A process according to claim 5 wherein each $R^1$ is n-butyl and n is 2.

8. A process according to claim 4 wherein each $R^1$ is H and n is 3.

9. A process according to claim 1 wherein R is 2-methoxyphenyl and each $R^1$ is H or $C_{1-4}$ alkyl.

10. A process according to claim 9 wherein each $R^1$ is $C_{1-4}$ alkyl.

11. A process according to claim 10 wherein each $R^1$ is ethyl.

12. A process according to claim 1 wherein the alumina-containing titanium dioxide is present in a concentration of up to about 5 percent by weight based on the weight of polyamide.

13. A process according to claim 12 wherein the alumina-containing titanium dioxide contains up to about 8 percent by weight of alumina.

14. A process according to claim 13 wherein the alumina-containing titanium dioxide contains up to about 2 percent by weight of alumina.

* * * * *